United States Patent [19]

Hudson, Jr.

[11] Patent Number: 4,630,439
[45] Date of Patent: Dec. 23, 1986

[54] EXHAUST GAS AFTERBURNER

[75] Inventor: Sharon J. Hudson, Jr., Lambertville, Mich.

[73] Assignee: Sharon Manufacturing Company, Lambertville, Mich.

[21] Appl. No.: 740,580

[22] Filed: Jun. 3, 1985

[51] Int. Cl.⁴ .............................................. F01N 3/30
[52] U.S. Cl. .................................................... 60/305
[58] Field of Search ................. 60/304, 305, 307, 308

[56] References Cited

U.S. PATENT DOCUMENTS

| | | | |
|---|---|---|---|
| 3,520,131 | 7/1970 | Briggs | 60/308 |
| 3,522,702 | 8/1970 | Grosseau | 60/305 |
| 3,613,359 | 10/1971 | Posh | 60/305 |
| 3,630,031 | 12/1971 | Grainger | 60/305 |
| 3,906,725 | 9/1975 | Addoms | 60/307 |

FOREIGN PATENT DOCUMENTS 6818 1/1977 Japan ................................. 60/305

Primary Examiner—Douglas Hart
Attorney, Agent, or Firm—Harold F. Mensing

[57] ABSTRACT

An afterburner device for injecting fresh air laterally into the exhaust gas streams of a multiple cylinder internal combustion engine. The afterburner has a planar gasket section for mounting between the engine block and the exhaust manifold. Exhaust gas stream port holes extend laterally through the gasket section in alignment with similar port holes in the engine block and manifold. A plurality of fresh air input passages within the gasket section extend from the port holes to a fresh air supply plenum section of the afterburner.

20 Claims, 5 Drawing Figures

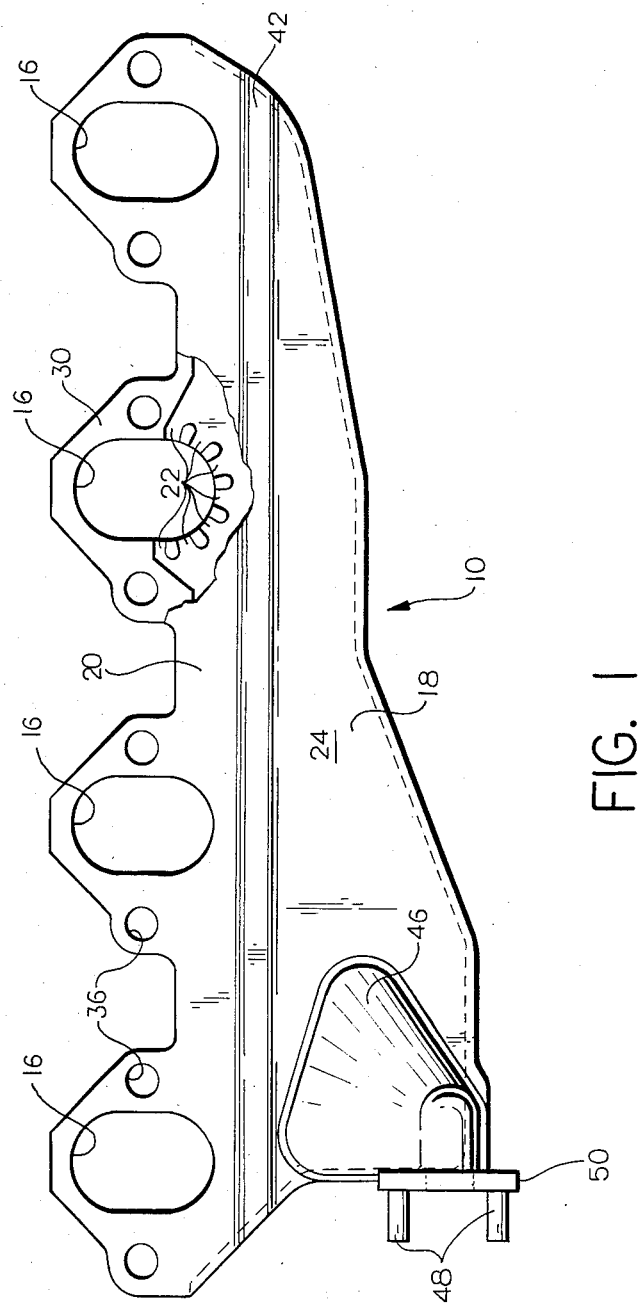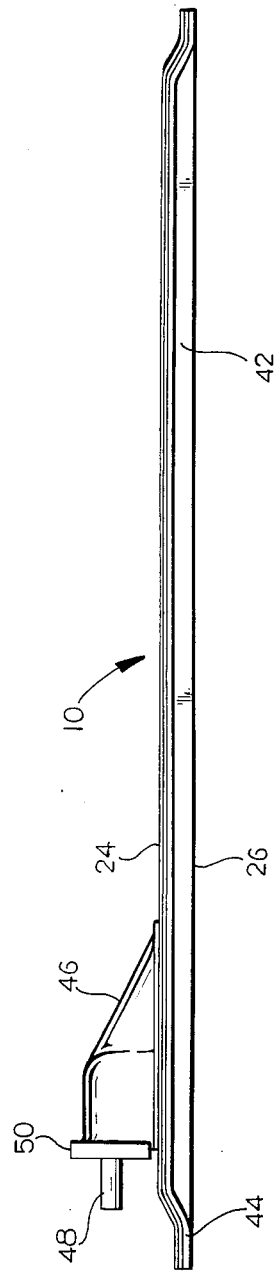

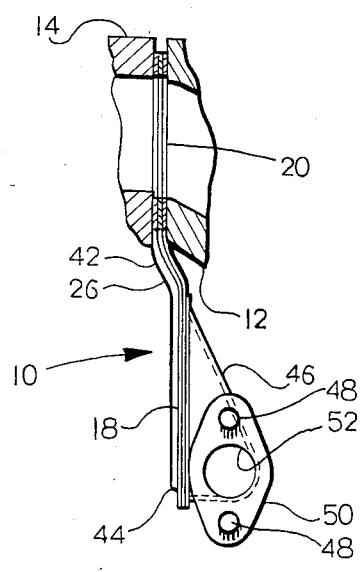
FIG. 3
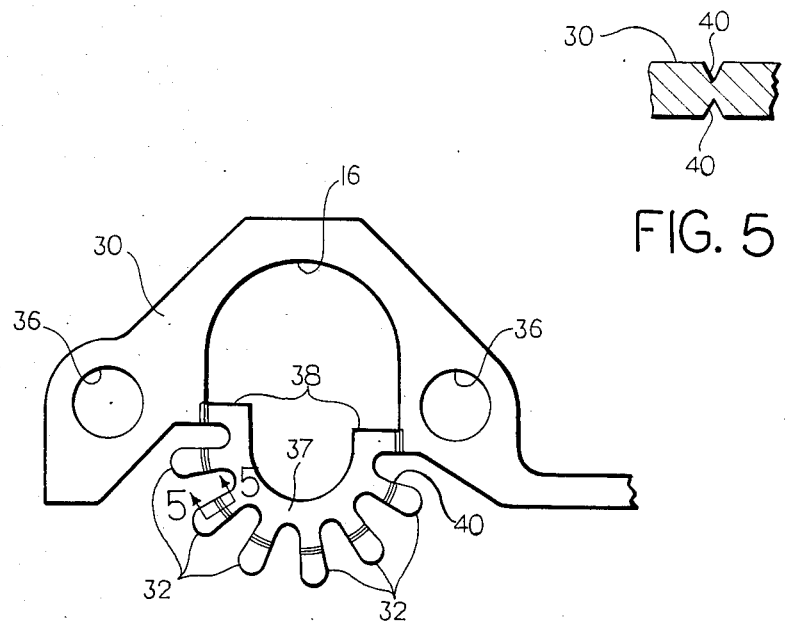
FIG. 5
FIG. 4

EXHAUST GAS AFTERBURNER

BACKGROUND OF THE INVENTION

The invention relates to an exhaust gas afterburner device for internal combustion engines. More specifically it relates to a hollow plate type fitment for injecting a plurality of streams of fresh air laterally into each exhaust gas stream through a thin planar gasket area of the fitment located between the engine block and its exhaust manifold. Fresh air is supplied under pressure to the gasket section through an integrally attached thin plenum section extending along the underside or bottom edge of the gasket section. The injection of fresh air through a plurality of input openings surrounding a substantial portion of each exhaust gas stream provides improved afterburning over comparable prior art systems which inject air into each exhaust gas stream through a single input opening. A number of other significant advantages provided by this invention relate to the fact that the fresh air input passages are spread over a relatively large area of the gasket section surrounding each exhaust port. The fresh air is preheated efficiently as it flows through relatively narrow passages disposed within the gasket section and in doing so cools a portion of the gasket section thus providing a partial thermal barrier at the interface of the engine block and manifold. Some prior preheating also occurs in the thin plenum section because of its location in close proximity to the hot exhaust manifold. Additionally installation is simplified because the afterburner fitment replaces the manifold gasket and does not require multiple tubing connections.

SUMMARY OF THE INVENTION

Generally speaking the exhaust gas afterburner device supplies a plurality of fresh air streams laterally to each exhaust gas stream of an internal combustion engine at a location between the exhaust manifold and the engine block. It comprises a plate type fitment having a hollow plenum section and an integrally connected planar gasket section embracing one or more exhaust gas port holes. It is made of two sheet metal plate members and a planar spacer. The spacer is sandwiched between the gasket section of the plate members and is designed to provide a plurality of narrow passageways extending from the plenum section through the plane of the spacer to the exhaust gas port holes. Fresh air is supplied under pressure from a remote source connected to an inlet incorporated with a distributor member located at one end of the plenum.

This afterburner device and the advantages it provides will be understood best if the written description is read with reference to the accompanying drawings.

BRIEF DESCRIPTION OF THE DRAWINGS

FIG. 1 is a side view of the afterburner device with a portion of the outside broken away around an exhaust gas port to show the fresh air input passages.

FIG. 2 is a bottom view of FIG. 1.

FIG. 3 is an end view of FIG. 1 showing the installed location of the afterburner device between broken away portions of an engine block and exhaust manifold.

FIG. 4 is an enlarged side view of an end portion of the spacer showing the radially disposed spokes connected to a break-away member prior to assembly.

FIG. 5 is a further enlarged cross sectional view taken along lines 5—5 of FIG. 4 showing the breakaway grooves.

GENERAL DESCRIPTION OF THE INVENTION

The afterburner device 10 illustrated in the drawings is designed for placement between the exhaust manifold 12 and corresponding portions of the engine block 14 containing the exhaust ports 16 of a multi-cylinder internal combustion engine. Functionally it is comprised of a hollow fresh air supply plenum section 18 and an integrally connected planar gasket section 20. Oxygen rich air is supplied to an inlet at the left end of the plenum and then fed to a large portion of the lower periphery of each exhaust port hole 16 in the gasket section 20 through passageways 22 from the plenum section 18.

The three major components of the afterburner device 10 include a sheet metal plate member 24 on the manifold side, a similar plate member 26 on the engine block side and a spacer 30 sandwiched between the two plate members 24, 26 in the gasket section 20.

The spacer 30 surrounds the exhaust gas port holes 16 and basically has the same shape as an ordinary manifold gasket would have for the engine involved. The port holes 16 are identical in size and shape and each of them has semi circular top and bottom ends separated by a rectangular midsection of equal width. Passageways 22 which extend upwardly from the top of the plenum section 18 through the spacer 30 to the semi circular bottom ends of port holes 16 are spaced around these bottom ends and are radially disposed with respect to them. In the illustrated embodiment there are seven passageways for each port hole 16. These passageways are defined by six equally spaced spokes 32 which have radially disposed sides and rounded heads at the plenum ends of the spokes. It should also be noted that the passages on the left side of each port hole face the air supply end of the plenum and the uppermost passageway 22 on the left side of each port hole 16 is at a higher level than the uppermost passageway on the right side (see FIG. 4). This is possible because additional space is provided on the left side of the port holes 16 by offsetting them to the right of center between their respective pairs of mounting stud holes 34.

Preferably for ease of assembly the tail or inner ends of the spokes 32 are initially attached to a break-away member 37 which is in turn attached to the spacer 30 by two opposed fingers 38. V-grooves 40 are provided on opposite surfaces of the break-away member along parting lines which coincide with the outline of the lower section of each port hole 16 so that the break-away members 37 can be easily and cleanly removed after assembly.

Spacer 30 is laminated between the flat gasket sections of the sheet metal plate members 24, 26 which have exhaust port and mounting stud holes that conform with those of the spacer. The upper portions of these sections have the same outline as the top and ends of the spacer whereas their lower portions extend over the radially disposed spokes 32 of the spacer to the plenum section which lies directly beneath the bottom edge of the spacer. The portions of the plate members 24, 26 between the spokes 32 define the parallel walls of the passageways 28. Just below the line where the gasket section merges with the plenum section there is an angular step 42 which offsets the remaining lower portion of the plenum outwardly from the parallel gasket section towards the exhaust manifold 12 (see FIG. 3).

Preferably the space between the plate members of the plenum section is maintained at a uniform thickness equal to the thickness of the spacer 30 by means of a narrow step 44 extending around the outside of the plenum section 18 of one plate member 24. The heighth of the plenum section 18 is reduced from a maximum at the air supply end on the left of FIG. 1 to a minimum at the closed end on the right thereof. Air is fed into the plenum section 18 under pressure from a remote source (not shown) through a fresh air inlet to a distributor nose section 46 mounted on the left end of plate member 24. The distributor 46 deflects the longitudinally flowing incoming air laterally and spreads it across the entire entrance end of plenum section 18. Baffles or other means may be provided to balance the amount of air supplied through the passageways 22 to the exhaust port openings 16.

Preferably the components are made of an appropriate grade of stainless steel that is capable of withstanding the relatively severe environment they will be subjected to during use. However, it is to be understood that the teachings of this invention could be practiced with materials other than the currently preferred stainless steel material.

The relative size, shape and location of the components of the afterburner device are important as is its location between the engine block and exhaust manifold. Other important features include the fact that there are a plurality of fresh air input openings communicating with each exhaust port and these openings are dispersed around a relatively large portion of the periphery of each port, preferably at least 40 percnet thereof. The input openings have rectangular cross sections with their longer dimensions being disposed circumferentially with respect to the exhaust port. The shorter dimensions of the rectangular openings are equivalent to the thickness of the spacer 30 which for example is 0.09 of an inch in the illustrated embodiment. The total open area provided by all the fresh air input apertures in the gasket section is greater than the area of the fresh air inlet to the plenum section. Preferably it is at least 20 per cent greater.

With the exception of a pair of threaded studs 48 on the connecting flange 50 of the fresh air inlet 52, the components of the afterburner device are made by stamping processes. The components are assembled by being placed in their respective positions along with an appropriate brazing material. Then they are introduced to a brazing furnace where they become sealed together into a unitized fitment under a protective atmosphere. Subsequently the break-away or sacrificial sections 37 of the spacer 30 are knocked out of the exhaust port openings 16 and the afterburner device is ready for installation.

What is claimed is:

1. An exhaust gas afterburner device adapted for installation between an exhaust manifold and a corresponding portion of the engine block of an internal combustion engine, said device comprising: a spacer sandwiched between portions of two sheet metal members forming a gasket section of said device, said gasket section surrounding at least one exhaust gas port, a plenum section formed by remaining portions of said members, wall sections defining a plurality of passageways extending from the interior of said plenum section to said port and an air supply inlet on said plenum.

2. A device according to claim 1 wherein said device is adapted for use on a multicylinder engine having a plurality of exhaust gas ports, said gasket section surrounds each individual port and each of said ports is in fluid communication with the interior of said plenum section through a plurality of passageways.

3. A device according to claim 2 wherein said plenum section is elongated and has two opposite ends, said air supply inlet is located at one end, and said one end of said plenum section has a larger internal cross sectional space than that of the other end.

4. A device according to claim 3 wherein said air supply inlet includes a distributor for dispersing an incoming air stream over said larger end.

5. A device according to claim 1 wherein said spacer is of uniform thickness and the open space distance between said sheet metal member portions forming a major portion of said plenum section is of a corresponding thickness.

6. A device according to claim 1 wherein said gasket section is planar and said plenum section has an angular offset which displaces it from the plane of the gasket section towards the exhaust manifold.

7. A device according to claim 1 wherein said wall sections defining said passageways comprise opposed internal wall surfaces of said spacer and said sheet metal members.

8. A device according to claim 1 wherein said passageways are disposed in a plane and have rectangular cross sections.

9. A device according to claim 8 wherein the length dimension of each rectangular cross section parallels the plane and the width dimension is perpendicular to the plane.

10. A device according to claim 1 wherein said passageways are radially disposed and the open area of the ends adjacent to the plenum is larger than the open area of the ends adjacent to the exhaust port.

11. A device according to claim 1 wherein the combined open area of the ends of the passageways adjacent to said exhaust port exceeds the open area of the air supply inlet.

12. A device according to claim 1 wherein the ends of the passageways adjacent to the exhaust port are disposed around at least 40 per cent of the periphery thereof.

13. A device according to claim 1 wherein the sidewalls of said passageways are formed by spokes which have been broken away from a sacrificial hub portion of said spacer after final assembly.

14. An exhaust gas afterburner device for a multicylinder internal combustion engine, said device comprising: an elongated air supply plenum section having two opposite ends, an air supply inlet at one end, said one end having a larger internal cross sectional space than that of the other end, an attached gasket section for mounting between an exhaust manifold and a corresponding portion of an engine block containing exhaust ports, said gasket section having a plurality of exhaust port openings corrresponding to those of said engine block, said gasket section having a flat annular section extending around each of said exhaust port openings and a means for introducing air through said flat annular section from said plenum to said exhaust port openings.

15. An exhaust gas afterburner device according to claim 14 wherein said means comprises a distributor on said larger end for dispersing an incoming air stream thereover and a series of separate passageways having input openings disposed around a portion of the periphery of each exhaust port opening.

16. An Exhaust gas afterburner device according to claim 15 wherein said input openings have rectanglar cross sections and are disposed lengthwise end to end.

17. An exhaust gas afterburner device according to claim 15 wherein each of said series of passageway input openings extends around at least 40 per cent of the periphery of its respective exhaust port opening and includes the bottom portion of the opening.

18. An exhaust gas afterburner device for a multicylinder internal combuston engine having exhaust port openings, said device comprising: an air input section defining a plurality of passageways having input openings disposed around a peripheral portion of each exhaust port opening, said air input section having two planar outer members and a spacer sandwiched therebetween, an air supply plenum section integrally attached to said air input section with the interior thereof being in fluid communication with all of said passageways and an air supply inlet on said plenum section.

19. An exhaust gas afterburner device according to claim 18 wherein said input openings are disposed around at least 40 per cent of the periphery of each exhaust port opening and the sidewalls of said passageways are formed by spokes which have been broken away from a sacrificial hub portion of said spacer after final assembly.

20. An exhaust gas afterburner device according to claim 19 wherein said input openings have rectangular cross sections and are disposed longitudinally end to end in a line around a peripheral portion of each exhaust port opening.

* * * * *